(No Model.)
G. BEEKMAN.
MECHANISM FOR ACTUATING PICKERS FOR COTTON HARVESTERS.
No. 501,669. Patented July 18, 1893.
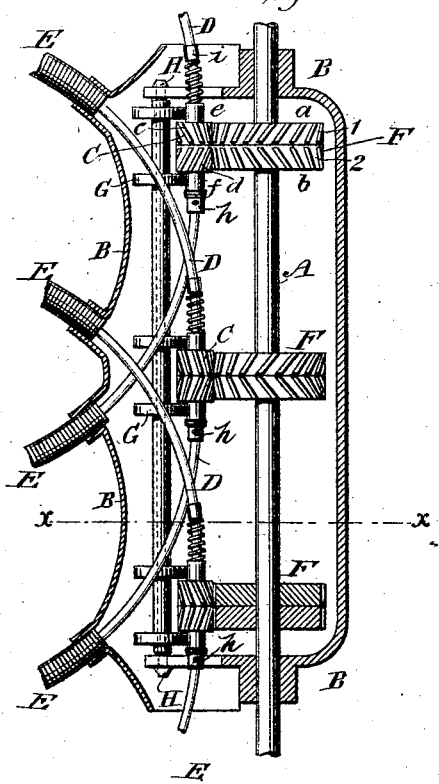
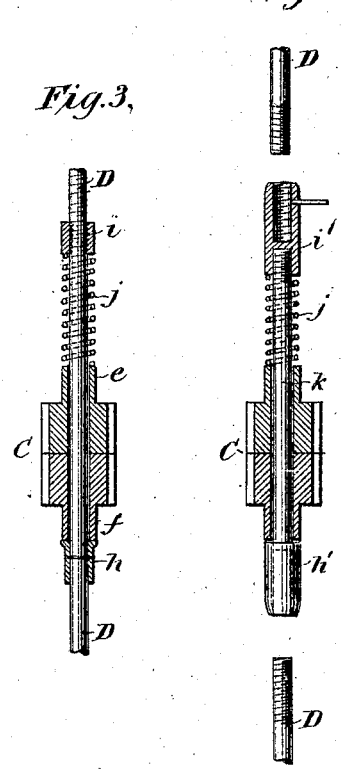
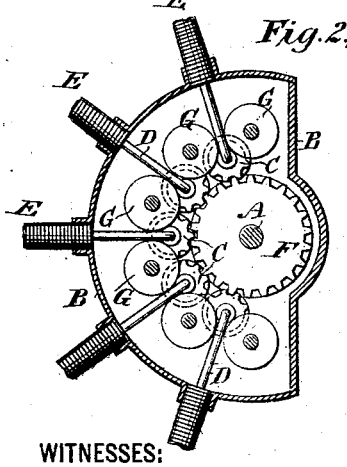
WITNESSES:
Edward Thorpe
A. R. Dunne
INVENTOR
Gerard Beekman.
BY
Henry F. Parker.
ATTORNEY

UNITED STATES PATENT OFFICE.

GERARD BEEKMAN, OF NEW YORK, N. Y.

MECHANISM FOR ACTUATING PICKERS FOR COTTON-HARVESTERS.

SPECIFICATION forming part of Letters Patent No. 501,669, dated July 18, 1893.

Application filed May 25, 1892. Serial No. 434,360. (No model.)

*To all whom it may concern:*

Be it known that I, GERARD BEEKMAN, a citizen of the United States, residing in the city, county, and State of New York, have invented certain new and useful Improvements in Mechanism for Actuating Pickers for Cotton-Harvesters, of which the following is a specification.

My invention relates to cotton pickers wherein rotary flexible stems are employed to seize the cotton, and my invention more especially relates to the character of a picker described in my patent application, Serial No. 389,932, filed April 22, 1891, wherein the flexible stems are projected in groups from subordinate oscillatory supports designed for attachment to a common rotary support. The groups thus suspended are caused to enter and retire from the branches of the plant while moving backward at substantially the same rate of speed as the motion of the harvester forward over the ground.

My invention is applicable for actuating flexible or other cotton picking stems of any suitable character, but said invention is especially designed for pickers composed of masses of unworked cotton or other fiber as described in my separate patent application, Serial No. 434,359, filed simultaneously herewith, which are connected to the end of flexible shafts in a position to be exposed to the plant and caused to rotate in contact therewith.

My invention consists in the construction and novel arrangement of parts as hereinafter specified and particularly pointed out in the appended claims.

In order to enable others skilled in the art to which my invention appertains to understand and use the same, I will proceed to describe its details of construction, explain its operation and subsequently point out in the appended claims its novel characteristics.

Referring to the accompanying drawings:—

Figure 1, is a vertical sectional elevation taken through one of the subordinate supports showing the interior mechanism; Fig. 2, a horizontal section of Fig. 1, taken on the line $x, x$; Fig. 3, an enlarged detail view showing one of the bobbins in section; and Fig. 4, a similar view showing a modification.

A, Fig. 1, represents the driving shaft connected to any suitable part of the harvesting machine and continuously rotated in one direction.

B, represents the case or covering supported on the shaft A, which said case or covering may be stationary, or, as described in aforesaid patent applications, permitted to oscillate to a limited extent about the axis of the shaft A.

C, are the bobbins bearing at each end the respective picking stems or flexible picker shafts D, which project outwardly through the flexible tubular arms E.

F, represents the driving gears on the shaft A.

The bobbins C and the gears F are toothed and intermesh at all times to effect a positive transmission of rotation. In order to prevent rattling or irregularity of transmission, the teeth $a, b$, on the gears F, are V-shaped or of double spiral form, as also are the teeth $c, d$, on the bobbin C, in double spirals. The upper halves 1, of the wheels F, and C, are made separate from the lower halves 2, in order to facilitate cutting the teeth. The bobbins C, have reduced peripheries $e, f$, above and below the same on which bear the flanges of the idlers G. The idlers G, have bearings on an axial rod H, in the frame B, and maintain the bobbins C in continuous engagement with the wheels F.

The flexible shafts D, are not positively connected to the bobbin C, but are permitted to turn loosely therein, and upon a portion of the shaft D beneath its bobbin there is a collar $h$, secured thereto, and upon a portion of said shaft D above the bobbin there is another collar $i$, also secured thereto. The collar $h$, illustrated is secured by a pin. The collar $i$, illustrated is screw threaded so as to be passed over the shaft D, which is composed of a strand of flexible material such as leather. Between the collar $i$, and the upper reduced end $e$, of the bobbin C, there is interposed a spiral spring $j$, which serves to keep the collar $h$, bearing firmly against the lower reduced end $f$, of the bobbin C, with sufficient friction to prevent the shaft D, turning in the bobbin C, except when encountering unusual opposition at such times as hereinbefore referred to.

In Fig. 4, in lieu of extending the flexible shaft D, of leather or like material, entirely through the bobbin C, in a continuous piece, a metallic spindle $k$, is employed, turning loosely in the said bobbin. The spindle $k$ has at its lower end, a shoulder $h'$ interiorly screw threaded for the reception of the leather or other flexible shaft D, and at the upper end of the spindle $k$ there is secured a second shoulder or collar $i'$, interiorly screw threaded for the reception of the upper strand D. A spring $j$ is interposed in a similar manner and for a similar purpose as in Fig. 3. It is preferable that the screw threads in $h'$, $i'$, be oppositely disposed in order that the intended direction of rotation may always retain the shafts D, D in place within the screw threads.

When any of the fibrous or other pickers on the extremities of any of the flexible shafts D, D, become twisted upon the cleaning brush, or other object, or otherwise encounter a serious opposition such as to obstruct the rotation of shafts D, the said shafts or their spindles $k$, as the case may be, will remain stationary within the bobbins C, the latter continuing to revolve without injury to the apparatus. At other times the shafts D, D, are rotated with the bobbin through the frictional agency of the springs $j$, and collar $h$.

The hereinbefore described arrangement is thus designed as a safety device. In case of a moderate obstruction to the rotation of the extremities of the shaft D, the said shafts having torsional elasticity, will yield to a considerable extent and take up the lost motion by twisting upon themselves in ordinary emergencies. The spring $j$ is designed to be frictionally compressed so tight as to avoid slipping until such a great strain is brought upon the rotative parts as to endanger breakage of the shaft D, or other injury.

The gear teeth $a$, $b$, $c$, $d$, disposed at opposite angles serve to maintain the bobbins C, at their proper level opposite the driving gears F, of their own tendency.

Between the adjacent ends of the gear teeth $a$, $b$, and $c$, $d$, spaces are left to allow the accumulations of dust and oil to pass out and prevent clogging.

Having thus fully described my invention, what I claim, and desire to secure by Letters Patent, is—

1. In a mechanism for actuating rotary pickers for cotton harvesters, the combination of a rotary toothed bobbin, and means for supporting the same, a picker shaft frictionally attached to the bobbin bearing two pickers extending in opposite directions of its axis, and a toothed driving gear engaging with the bobbin; said bobbin and gear provided with oppositely inclined spiral teeth adapted to center the bobbin vertically, substantially as described.

2. In a mechanism for actuating rotary pickers for cotton harvesters, the combination of a picker bobbin and a picker shaft extending through the axis of a bobbin frictionally engaging therewith, an idler having smooth flanges engaging with corresponding smooth peripheries or reduced ends of the said bobbin to support it in its proper position, and a gear for rotating the bobbin; said bobbin and gear being provided with oppositely inclined spiral teeth adapted to center the bobbin vertically, substantially as described.

GERARD BEEKMAN.

Witnesses:
EUGENE LUCAS,
H. F. PARKER.